(12) United States Patent
Luck et al.

(10) Patent No.: US 9,650,911 B1
(45) Date of Patent: May 16, 2017

(54) VARIABLE GEOMETRY TURBINE

(71) Applicant: Cummins Ltd, Huddersfield, West Yorkshire (GB)

(72) Inventors: David A. Luck, Huddersfield (GB); Jeffrey Carter, Huddersfield (GB)

(73) Assignee: CUMMINS LTD, Huddersfield (GB)

( * ) Notice: Subject to any disclaimer, the term of this patent is extended or adjusted under 35 U.S.C. 154(b) by 0 days.

(21) Appl. No.: 14/511,680

(22) Filed: Oct. 10, 2014

(51) Int. Cl.
  *F02D 23/00* (2006.01)
  *F01D 17/14* (2006.01)
  *F02B 37/22* (2006.01)

(52) U.S. Cl.
  CPC ............ *F01D 17/143* (2013.01); *F02B 37/22* (2013.01)

(58) Field of Classification Search
  CPC ................................ F01D 17/143; F02B 37/22
  USPC ....................... 60/602; 415/111, 173.5, 174.2
  See application file for complete search history.

(56) References Cited

U.S. PATENT DOCUMENTS

| | | | | |
|---|---|---|---|---|
| 4,499,731 A * | 2/1985 | Moser | ................... | F01D 17/105 415/157 |
| 6,203,272 B1 * | 3/2001 | Walsham | .............. | F01D 17/143 415/158 |
| 7,475,540 B2 * | 1/2009 | Parker | ..................... | F01D 17/14 415/145 |
| 7,810,327 B2 * | 10/2010 | Parker | ................... | F01D 17/141 415/158 |
| 2004/0128997 A1* | 7/2004 | Parker | ..................... | F01D 17/14 60/602 |
| 2005/0060999 A1* | 3/2005 | Mulloy | ................... | F01D 17/14 60/602 |
| 2006/0010864 A1* | 1/2006 | Mulloy | ................. | F01D 17/143 60/602 |
| 2008/0089782 A1* | 4/2008 | Parker | ................... | F01D 17/143 415/150 |
| 2009/0097969 A1* | 4/2009 | Spuler | ................... | F01D 17/143 415/159 |
| 2009/0142186 A1* | 6/2009 | Parker | ................... | F01D 17/143 415/159 |
| 2011/0076139 A1* | 3/2011 | Brown | .................. | F01D 17/143 415/159 |
| 2012/0128471 A1* | 5/2012 | Luck | ..................... | F01D 17/143 415/158 |

* cited by examiner

*Primary Examiner* — Nicholas J Weiss
*Assistant Examiner* — Jason T Newton
(74) *Attorney, Agent, or Firm* — Faegre Baker Daniels LLP

(57) ABSTRACT

A variable geometry turbine comprises a turbine wheel and a primary inlet passage of variable axial width. The turbine has a secondary inlet passage provides a flow path for a working fluid which circumnavigates at least part of the primary inlet passage. A seal element and one or more apertures are cooperable to selectively allow or prevent fluid flow through the secondary inlet passage. The turbine wheel is of the radial-inflow axial-outflow type and secondary inlet passage has an outlet configured to direct working fluid to exit the secondary inlet passage in a direction which has an axial component in the opposite direction to the direction of axial outflow of the turbine wheel.

14 Claims, 5 Drawing Sheets

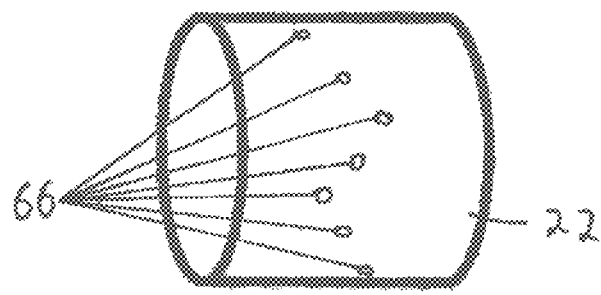
FIG. 4A
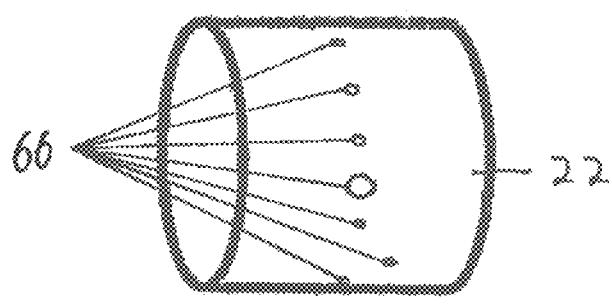
FIG. 4B
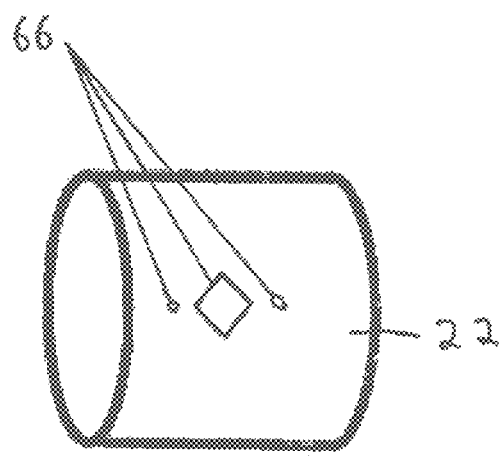
FIG. 4C
FIG. 4

VARIABLE GEOMETRY TURBINE

The present invention relates to a variable geometry turbine and has particular, but not exclusive, application to variable geometry turbochargers.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

The turbine stage of a conventional turbocharger comprises: a turbine housing defining a turbine chamber within which the turbine wheel is mounted; an annular inlet passage defined in the housing between facing radially extending walls arranged around the turbine chamber; an inlet arranged around the inlet passage; and an outlet passage extending from the turbine chamber. The passages and chamber communicate such that pressurised exhaust gas admitted to the inlet flows through the inlet passage to the outlet passage via the turbine chamber and rotates the turbine wheel. It is known to improve turbine performance by providing vanes, referred to as nozzle vanes, in the inlet passage so as to deflect gas flowing through the inlet passage towards the direction of rotation of the turbine wheel.

Turbines of this kind may be of a fixed or variable geometry type. Variable geometry turbines differ from fixed geometry turbines in that the size of the inlet passage can be varied to optimise gas flow velocities over a range of mass flow rates so that the power output of the turbine can be varied in line with varying engine demands.

In one known type of variable geometry turbine, an axially moveable wall member defines one wall of the inlet passage. The position of the movable wall member relative to a fixed facing wall of the inlet passage is adjustable to control the axial width of the inlet passage. Thus, for example, as exhaust gas flow through the turbine decreases, the inlet passage width may be decreased to maintain the gas velocity and optimise turbine output.

The axially movable wall member may be a "nozzle ring" that is provided with vanes that extend into the inlet passage and through orifices provided in a shroud plate defining the fixed facing wall of the inlet passage, the orifices being designed to accommodate movement of the nozzle ring relative to the shroud. Typically the nozzle ring may comprise a radially extending wall (defining one wall of the inlet passage) and radially inner and outer axially extending walls or flanges that extend into an annular cavity behind the radial face of the nozzle ring. The cavity is formed in a part of the turbocharger housing (usually either the turbine housing or the turbocharger bearing housing) and accommodates axial movement of the nozzle ring. The flanges may be sealed with respect to the cavity walls to reduce or prevent leakage flow around the back of the nozzle ring. In one common arrangement the nozzle ring is supported on rods extending parallel to the axis of rotation of the turbine wheel and is moved by an actuator, which axially displaces the rods.

In an alternative type of variable geometry turbocharger, the nozzle ring is fixed and has vanes that extend from a fixed wall through orifices provided in a moving shroud plate.

Actuators for moving the nozzle ring or movable shroud plate can take a variety of forms, including pneumatic, hydraulic and electric and can be linked to the nozzle ring or shroud plate in a variety of ways. The actuator will generally adjust the position of the nozzle ring or movable shroud plate under the control of an engine control unit (ECU) in order to modify the airflow through the turbine to meet performance requirements.

One example of a variable geometry turbocharger is disclosed in EP 0654587, which discloses a nozzle ring that is additionally provided with pressure balancing apertures through its radial wall. The pressure balancing apertures ensure that pressure within the nozzle ring cavity behind the nozzle ring is substantially equal to, but always slightly less than, the pressure applied to the nozzle ring face by gas flow through the inlet passage. This ensures that there is only a small unidirectional force on the nozzle ring which aids accurate adjustment of the nozzle ring position, particularly when the nozzle ring is moved close to the opposing wall of the inlet to reduce the inlet passage towards its minimum width.

In addition to the conventional control of a variable geometry turbocharger in an engine fired mode (in which fuel is supplied to the engine for combustion) to optimise gas flow, it is also known to take advantage of the facility to minimise the turbocharger inlet area to provide an engine braking function in an engine braking mode (in which no fuel is supplied for combustion) in which the inlet passage is reduced to smaller areas compared to those in a normal engine fired mode operating range.

Engine brake systems of various forms are widely fitted to vehicle engine systems, in particular to compression ignition engines (diesel engines) used to power large vehicles such as trucks. The engine brake systems may be employed to enhance the effect of the conventional friction brakes acting on the vehicle wheels or, in some circumstances, may be used independently of the normal friction braking system, to control, for example, the downhill speed of a vehicle. With some engine brake systems, the brake is set to activate automatically when the engine throttle is closed (i.e. when the driver lifts his foot from the throttle pedal), and in others the engine brake may require manual activation by the driver, such as depression of a separate brake pedal.

In one form of conventional engine brake system an exhaust valve in the exhaust line is controlled to block partially the engine exhaust when braking is required. This produces an engine braking torque by generating a high backpressure that retards the engine by serving to increase the work done on the engine piston during the exhaust stroke. This braking effect is transmitted to the vehicle wheels through the vehicle drive chain. U.S. Pat. No. 4,526,004 discloses such an engine braking system for a turbocharged engine in which the exhaust valve is provided in the turbine housing of a fixed geometry turbocharger.

With a variable geometry turbine, it is not necessary to provide a separate exhaust valve. Rather, the turbine inlet passage may simply be "closed" to a minimum flow area when braking is required. The level of braking may be modulated by control of the inlet passage size by appropriate control of the axial position of the nozzle ring or movable shorud plate. In a "fully closed" position in an engine braking mode the nozzle ring or movable shroud plate may in some cases abut the facing wall of the inlet passage. In some exhaust brake systems known as decompression brake systems, an in-cylinder decompression valve arrangement is controlled to release compressed air from the engine cylinder into the exhaust system to release work done by the compression process. In such systems closure of the turbine inlet both increases back pressure and provides boost pressure to maximise compression work.

A variable geometry turbocharger can also be operated in an engine fired mode so as to close the inlet passage to a minimum width less than the smallest width appropriate for normal engine operating conditions in order to control exhaust gas temperature. The basic principle of operation in such an "exhaust gas heating mode" is to reduce the amount of airflow through the engine for a given fuel supply level (whilst maintaining sufficient airflow for combustion) in order to increase the exhaust gas temperature. This has particular application where a catalytic exhaust after-treatment system is present. In such a system performance is directly related to the temperature of the exhaust gas that passes through it.

To achieve a desirable performance the exhaust gas temperature must be above a threshold temperature (typically lying in a range of about 250° C. to 370° C.) under all engine operating conditions and ambient conditions. Operation of the exhaust gas after-treatment system below the threshold temperature range will cause the system to build up undesirable accumulations which must be burnt off in a regeneration cycle to allow the system to return to designed performance levels. In addition, prolonged operation of the exhaust gas after-treatment system below the threshold temperature without regeneration will disable the system and cause the engine to become non-compliant with government exhaust emission regulations.

For the majority of the operating range of, for example, a diesel engine, the exhaust gas temperature will generally be above the required threshold temperature. However, in some conditions, such as light load conditions and/or cold ambient temperature conditions, the exhaust gas temperature can often fall below the threshold temperature. In such conditions the turbocharger can in principle be operated in the exhaust gas heating mode to reduce the turbine inlet passage width with the aim of restricting airflow thereby reducing the airflow cooling effect and increasing exhaust gas temperature.

For both engine braking and exhaust gas heating, is important to allow some exhaust gas flow through the turbine of the turbocharger. If the exhaust from an engine is restricted to too great an extent, this can lead to excessive heat generation in the engine cylinders, failure of exhaust valves, and the like. There must therefore be provision for at least a minimum leakage flow through the turbine when the nozzle ring or movable shroud plate is in a fully closed position in an engine braking mode.

However, due to their high efficiency modern variable geometry turbochargers can generate such high boost pressures even at small inlet widths that their use in an engine braking mode can be problematic as cylinder pressures can approach, or exceed, acceptable limits unless countermeasures are taken (or braking efficiency is sacrificed). This can be a particular problem with engine brake systems including a decompression braking arrangement. Similarly, in relation to exhaust gas heating, the high boost pressures achieved at small inlet widths can actually increase the airflow to the engine, offsetting the effect of the restriction and thus reducing the desired heating effect.

These problems have been addressed up to a point by documents such as EP1435434 and US2005/0060999A 1, which teach the use of bypass passages which open when a movable nozzle ring is closed, increasing the flow rate of exhaust through the turbine and limiting the exhaust pressure (and heat build-up) at the engine. However, such bypass passages can be prone to clogging due to build-up of soot.

It is one object of the present invention to obviate or mitigate at least one of the above disadvantages, and/or to provide an improved or alternative variable geometry turbine, turbo charger or internal combustion engine.

According to a first aspect of the invention there is provided a variable geometry turbine comprising:
  a turbine wheel supported in a housing for rotation about a turbine axis, the turbine wheel being of radial-inflow axial-outflow type and the housing having a first wall;
  an axially movable operating member having a second wall;
  a primary inlet passage upstream of the turbine wheel, the inlet passage being defined between the first wall of the housing and the second wall of the operating member, the axial width of the inlet passage being controllable by moving the operating member between a first axial position in which the second wall is axially distal from the first wall, and a second axial position in which the second wall is axially proximal to the first wall;
  a secondary inlet passage configured to provide a bypass flow path for a working fluid which circumnavigates at least part of the primary inlet passage;
  a seal element and one or more apertures, one of the seal element and the one or more apertures being axially fixed relative to the housing and the other being axially fixed relative to the operating member and movable therewith, the one or more apertures and the seal element thereby being axially movable relative to one another between a first configuration and a second configuration via movement of the operating member, wherein:
  with the one or more apertures and the seal element in the first configuration the seal element is positioned in the bypass flow path to substantially prevent fluid flow therethough, and with the one or more apertures and the seal element in the second configuration the seal element is positioned to allow flow of fluid through the one or more apertures and thereby through the secondary inlet passage;
  the seal element and the one or more apertures are arranged whereby moving the operating member to the first position moves the seal element and the one or more apertures to the first configuration, and moving the operating member to the second position moves the one or more apertures and the seal element to the second configuration; and
  the secondary inlet passage has an outlet configured to direct working fluid to exit the secondary inlet passage in a direction which has an axial component in the opposite direction to the direction of axial outflow of the turbine wheel.

For the avoidance of doubt, reference to radial-inflow axial-outflow is reference only to the type of the turbine wheel. It is not intended to be limited to a turbine in which the inlet flow is precisely radial or the outlet flow is precisely axial.

The secondary flow may be reintroduced towards the turbine (i.e. upstream of the turbine), which may allow it to disturb the primary flow by creating turbulence and altering the overall direction of fluid flow. This disturbance may reduce the efficiency of the turbine (thereby reducing the prevalence of unwanted high boost pressures, as discussed above) to a greater extent than could be achieved if the secondary flow were to bypass the turbine altogether. The secondary flow exiting the secondary inlet passage in a direction with an axial component opposite to the direction of axial outflow of the turbine wheel may increase this disturbance as the flow must be turned through a greater angle before becoming parallel with the outlet flow of the turbine, so the flow may be unstable (and therefore impart less energy to the turbine) for a longer period of time. Further, through correct radial positioning of the outlet of the secondary inlet passage, the secondary flow may cause the primary flow to 'rebound' from the input of the secondary flow. The primary flow may therefore develop an axial velocity component, in the direction of the axial outflow, as it enters the turbine. The primary flow entering the turbine in a direction nearer to the outlet flow required it to be turned by the turbine to a decreased extent, therefore less energy is imparted to the turbine by the change in direction of the flow. In some embodiments, there may be no primary flow due to the primary inlet passage being completely sealed when the operating member is in the second position. In this case the above disruptive effect on primary flow entering the turbine would not be present, but the angle of the secondary flow may still be sufficient for turbine efficiency to remain below the required level.

It is to be understood that reference to the direction of axial outflow is intended to include the expected direction of axial turbine outflow. It would be clear to the skilled person that a radial-inflow axial-outflow turbine has a direction of axial outflow, even if no fluid is currently passing through the turbine (or if fluid is passing through the turbine but is not exiting the turbine wheel in a direction precisely aligned with the turbine axis).

For the avoidance of doubt, reference to the 'axial component' of flow direction refers to the component, in a direction which is aligned with the turbine axis, of a vector in the direction of that flow (the remaining component being perpendicular to that component, and aligned in a radial direction). In other words, the flow through the secondary inlet passage having an axial component in the opposite direction to the direction of axial outflow of the turbine wheel is fulfilled where the dot product of a unit vector in the direction flow through the outlet of the secondary inlet passage, and a unit vector in the direction of axial outlet of the turbine wheel, is negative.

The outlet may be configured to direct working fluid to exit the secondary inlet passage in a direction at an angle of more than 160 degrees to the direction of axial outflow of the turbine wheel.

The secondary flow exiting the secondary inlet passage at more than 160 degrees to the direction of axial outflow may increase the magnitude of the effect of the secondary flow on overall turbine efficiency through the mechanisms described above, due to the secondary flow being nearer to the opposite direction in which it must ultimately flow upon exit from the turbine wheel.

Alternatively, said angle may be less than 160 degrees. For instance, it may be between 135 degrees and 160 degrees.

For the avoidance of doubt, reference to the angle between the direction of exit of secondary flow and the direction of axial outflow of the turbine wheel is reference to the angle through which secondary flow must rotate in order to become aligned with the direction of axial outflow. Further explanation is provided in the description below.

The secondary inlet passage may have an outlet configured to direct working fluid to exit the secondary inlet passage in a direction substantially opposite to the direction of axial outflow of the turbine wheel.

The secondary inlet passage may be substantially annular in shape and substantially circumferentially arranged about the turbine axis. For example, the inlet passage may be cylindrical or frustro-conical in shape, or it may be of an annular shape of complex circumferential cross-section.

The secondary inlet passage being substantially annular and substantially circumferentially arranged about the turbine axis may allow the secondary flow to be more uniform about the circumference of the turbine wheel. This may allow its disruptive effect on the overall flow into the turbine wheel to be more uniform, which in turn may allow the overall load on the turbine wheel to be more even. More even loading on the turbine wheel may allow it to run more smoothly (e.g. with less vibration due to uneven loading), and/or reduce the point loads exerted on it, and thereby increase its longevity.

The secondary inlet passage may be configured to provide a flow path for a working fluid which circumnavigates substantially the entire primary inlet passage. Alternatively, it may branch off and/or join (or rejoin) the primary inlet passage.

The one or more apertures may comprise a plurality of apertures. For instance, it may comprise at least 6 apertures.

Fluid being able to enter the secondary inlet passage at multiple locations through the different apertures may enable the secondary flow to be more even, which may provide one or more of the advantages discussed above.

The plurality of apertures may be provided in a substantially annular array substantially circumferentially disposed around the turbine axis.

The or each aperture of the one or more apertures may take the form of a through-bore, and define a longitudinal axis which is aligned in a substantially radial direction.

In one embodiment of the invention, the housing defines a support structure and the operating member takes the form of a sleeve mounted on said support structure, the secondary inlet passage being at least partially defined between a radially inner surface of the sleeve and a radially outer surface of the support structure.

As some existing turbines utilise such a sleeve and support structure, the above arrangement may require minimal structural and manufacturing changes to be made to existing designs and processes in order to produce turbines according to the invention.

The or each aperture of the one or more apertures may take the form of a through-bore running from a radially outer surface of the sleeve to a radially inner surface of the sleeve.

For the avoidance of doubt, where a turbine according to the above embodiment comprises this arrangement, the radially inner surface of the sleeve which at least partially defines the secondary inlet passage and the radially inner surface of the sleeve to which the through-bores run may or may not be the same surface.

The turbine may further comprise abutment surfaces to limit the axial movement of the operating member in both axial directions.

One of the abutment surfaces may be the first wall, and/or one may be a wall of the support structure of the housing (for instance it may be an axial end wall of the support structure, where present, or it may be a wall of the housing from which the support structure projects).

The turbine wheel may be mounted on one end of an axle which passes through a bearing held within the housing, and the operating member may be positioned on the axially opposite side of the turbine wheel to the bearing.

This arrangement may avoid the need for additional complexity in the area adjacent to the bearing (which may already comprise a number of bearings such journal bearings and thrust bearings, and/or lubrication systems and the like), and thereby simplify the design and manufacture of the turbine. Further, with the operating member so positioned it may be more accessible for an actuator, and may therefore require less complex linkages to be utilised than if the operating member was in the (complex and space-restricted) area around the bearing.

The turbine may further comprise a substantially annular array of vanes extending into the primary inlet passage for directing working fluid towards the turbine wheel, each vane being fixed to either the first wall or the second wall.

The vanes may all be fixed to the first wall or the second wall, or some may be fixed to each. They may terminate within the primary inlet passage, or may pass through it entirely.

The vanes may be fixed to the first wall, and the second wall may comprise a complementary array of orifices configured for receipt of the vanes therein.

The vanes may always be received within the orifices, or they may be received only when the first and second walls are within a predetermined axial distance from each other (for instance, they may be received in the orifices when the operating member is in the first position but not when it is in the second position).

According to a second aspect of the present invention there is provided a turbocharger comprising a variable geometry turbine according to the first aspect of the invention.

The second aspect of the invention may provide a turbocharger which may allow exhaust gas heating to take place, for instance while the engine is idling, with less or no unwanted impact on the boost pressure of air delivered to an engine for the reasons given above According to a third aspect of the present invention there is provided an internal combustion engine comprising a turbocharger according to the second aspect of the invention.

The third aspect of the invention may provide an internal combustion engine with improved exhaust heating performance due to one or more of the advantages discussed above.

Specific embodiments of the present invention will now be described, by way of example only, with reference to the accompanying drawings, in which:

FIG. 4 shows schematic side views of exemplary operating members with arrays of apertures therein.

Figure 1:
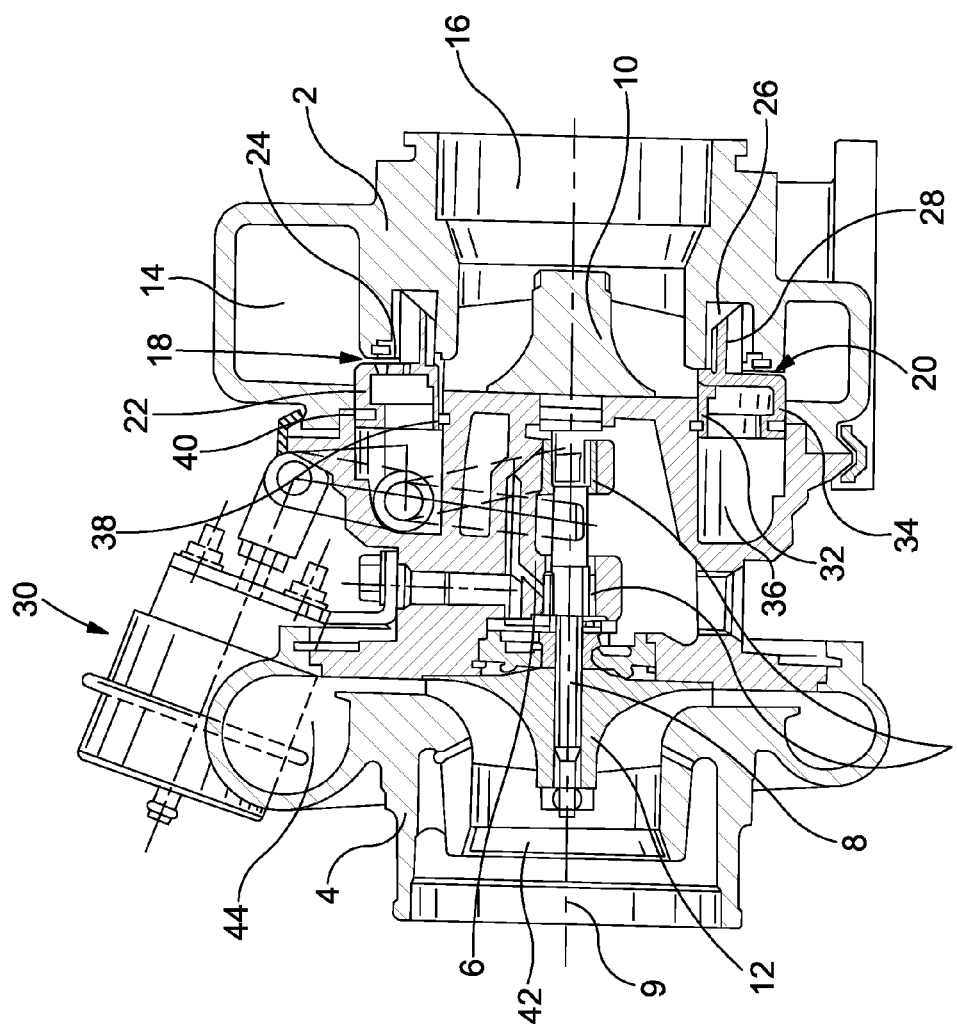
FIG. 1 shows a cross-sectional side view of a known variable geometry turbocharger.

FIG. 1 illustrates a known variable geometry turbocharger comprising a turbine housing 2 and a compressor housing 4 interconnected by a central bearing housing 6. A turbocharger shaft 8 extends from the turbine housing 2 to the compressor housing 4 through the bearing housing 6. A (radial-inflow axial-outflow type) turbine wheel 10 is mounted on one end of the shaft 8 for rotation within the turbine housing 2, and a (axial-inflow radial-outflow type) compressor wheel 12 is mounted on the other end of the shaft 8 for rotation within the compressor housing 4. The shaft 8 rotates about turbocharger axis 9 on bearings 13 located in the bearing housing 6, and thereby acts as an axle for the turbine wheel 10 and the compressor wheel 12.

The turbine housing 2 defines an inlet volute 14 to which gas from an internal combustion engine (not shown) is delivered. The exhaust gas flows from the inlet volute 14 to an axial outlet passage 16 via an inlet passage 18 and the turbine wheel 10. The inlet passage 18 is defined on one side by a first wall 24 in the form of a shroud plate, and on the opposite side by a radially-disposed second wall 20 (in the form of a nozzle ring) provided on an operating member 22. In this embodiment the shroud plate 24 is positioned at the mouth of an annular recess 26.

The nozzle ring 20 supports an array of circumferentially and equally spaced inlet vanes 28 each of which extends across the inlet passage 18. The vanes 28 are orientated to deflect gas flowing through the inlet passage 18 towards the direction of rotation of the turbine wheel 10. When nozzle ring 20 is proximate to the shroud plate 24, the vanes 28 project through suitably configured orifices in the shroud plate 24 and into the recess 26.

The axial position of the operating member 22, and therefore of the nozzle ring 20, is controlled by an actuator assembly 30 of the type disclosed in U.S. Pat. No. 5,868,552. By appropriate control of the actuator (which may for instance be pneumatic or electric), the axial position of the operating member 22 and thus of the nozzle ring 20 can be controlled. The speed of the turbine wheel 10 is dependent upon the velocity of the gas passing through the annular inlet passage 18. For a fixed rate of mass of gas flowing into the inlet passage 18, the gas velocity is related to the width of the inlet passage, the width being adjustable by controlling the axial position of the nozzle ring 20. For a fixed mass flow rate of gas flowing into the inlet passage 18, the narrower the width of the inlet passage, the greater the velocity of the gas passing through it. FIG. 1 shows the annular inlet passage 18 in a closed position as discussed above. The inlet passage 18 may be 'opened' to a maximum by moving the nozzle ring 20 away from shroud plate 24. When the separation between the nozzle ring 20 and the shroud plate 24 is at a maximum (such that the width of the inlet passage is at a maximum), the nozzle ring 20 may be said to be in an open position.

The operating member 22 has axially extending radially inner and outer annular flanges 32, 34 that extend into an annular cavity 36 provided in the bearing housing 6. Inner and outer seal elements 38 and 40 are provided to seal the operating member 22 with respect to inner and outer annular surfaces of the annular cavity 36 respectively, whilst allowing the operating member to slide axially within the annular cavity. The inner seal element 38 is supported within an annular groove formed in the radially inner annular surface of the cavity 36 and bears against the inner annular flange 32 of the operating member 22. The outer seal element 40 is supported within an annular groove formed in the radially outer annular surface of the cavity 36 and bears against the outer annular flange 34 of the operating member 22.

Gas flowing from the inlet volute 14 to the outlet passage 16 passes over the turbine wheel 10 and as a result, torque is applied to the shaft 8 to drive the compressor wheel 12. Rotation of the compressor wheel 12 within the compressor housing 4 pressurises ambient air present in an air inlet 42 and delivers the pressurised air to an air outlet volute 44, from which it is fed to an internal combustion engine (not shown).

Figure 2:
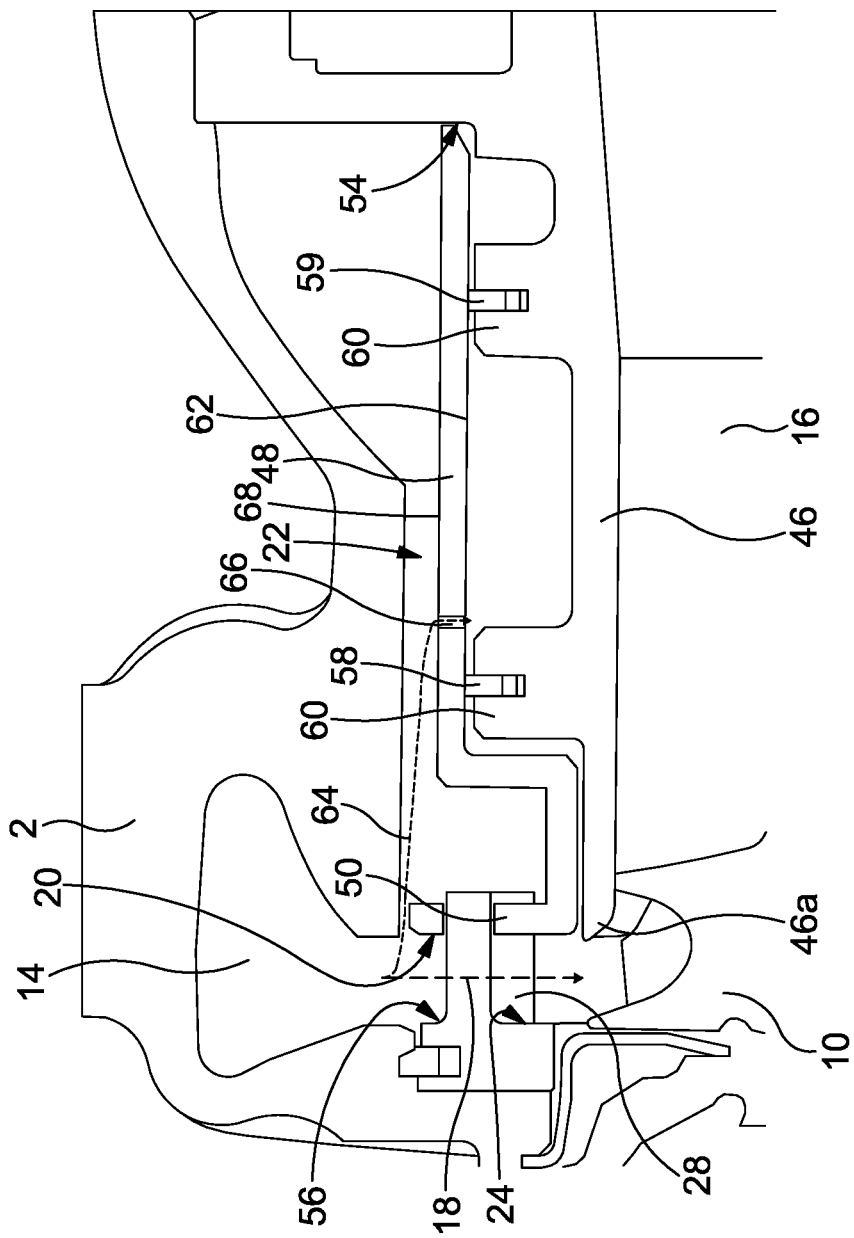
FIG. 2 shows a cross-sectional view of portion of a turbine according to an embodiment of the invention, with an operating member in a first position.

FIG. 2 shows a portion of a turbine according to an embodiment of the invention. The portion depicted is that above the rotational axis of the turbine wheel. In common with the turbine of the turbocharger shown in FIG. 1, the turbine of the embodiment shown in FIG. 2 has an inlet passage, in this case a primary inlet passage 18 (also referred to as a gas flow control passage) which is defined between a fixed first wall 24 provided on a turbine housing 2, and a second wall 20 mounted on an operating member 22 and axially movable therewith. Once again, the turbine shaft (not visible, but positioned downwards from the perspective of FIG. 2) is supported by bearings (not visible, but to the left from the perspective of FIG. 2), which include appropriate lubricating systems (not visible), located within a central bearing housing 6. However, in this case the operating member 22 is positioned on the axially opposite side of the turbine to each of the bearings (not shown) in the bearing housing 6.

Further, in this embodiment the first wall 24 is in the form of an axially fixed nozzle ring, and the second wall 20 is in the form of a movable shroud plate. In this case, the nozzle ring 24 is fixed to the housing 2. Like the inlet passage of the arrangement of FIG. 1, the primary inlet passage 18 of this embodiment is located downstream of an inlet volute 14 and upstream of a radial-inflow axial-outflow type turbine wheel 10 mounted to a turbine shaft. The primary inlet passage 18 is substantially annular in shape, and is positioned substantially circumferentially about the turbine axis (in this case the primary inlet passage is cylindrical in shape, with its radial thickness being greater than its axial length).

The nozzle ring 24 supports an array of circumferentially spaced inlet vanes 28 each of which extends fully across the primary inlet passage 18 and through suitably configured orifices in the shroud 20. The vanes 28 are orientated to deflect gas flow through the inlet passage 18 towards the direction of rotation of the turbine wheel 10.

The operating member 22 takes the form of a substantially cylindrical hollow sleeve which is slidably received on an approximately cylindrical support structure 46 provided on the housing 2. The support structure 46 is coaxial with the turbine axis, and extends towards the turbine wheel 10. In this embodiment the support structure 46 also defines the axial outlet passage 16 of the turbine, which is positioned downstream of the turbine wheel 10 and through which exhaust gas exits the turbine. The support structure 46 has an end portion 46a which is adjacent the turbine wheel 10, and has a surface which has a profile that corresponds to the outer profile of the turbine wheel 10. Due to the fact that the profile of the surface of the end portion 46a of the support structure 46 matches the outer profile of the turbine wheel 10, clearance between the turbine wheel 10 and the support structure 46 is minimised. Minimising the clearance between the turbine wheel 10 and the support structure 46 helps to prevent any loss in efficiency of the turbine (which is undesirable at least in normal operation) which may occur due to gas leaking from the primary inlet passage 18 upstream of the turbine wheel 10 to the outlet passage 16 downstream of the turbine wheel 10, without contributing to the rotation of the turbine wheel. The support structure 46 is mounted within the turbine housing 2, and in some embodiments may be integral with the turbine housing.

The operating member 22 is mounted on the support structure 46 such that it is concentric therewith, and is slidable along the support structure in an axial direction. An annular flange 50 extends substantially radially outwards from one end of a main body 48 of the operating member 22. The flange 50, comprises or forms the shroud 20 (the second wall). The operating member 22 also has attachment features (not visible) which are mechanically linked to an actuator (not shown) in order to move the operating member 22 relative to the fixed nozzle ring 24. The operating member 22 is thus axially movable along the support structure 46 between a first position, where the first and second walls 24, 20 are spaced apart from one another (i.e. an "open" position used during normal operation), and a second position, where the first wall 24 and second wall 20 are in contact or axially adjacent to one another (i.e. a "closed" or "fully closed" position as described above). The axial movement of the operating member 22 is limited by abutment surfaces. Its axial movement away from the turbine wheel 10 (which is the direction in which the operating member moves from the second position to the first position) is limited by an abutment surface 54 provided on a wall of the housing 2 from which the support structure 46 projects. The movement of the operating member 22 towards the turbine wheel 10 (the direction in which the operating member moves from the first position to the second position) is limited by an abutment surface 56 co-operatively defined by fillets at the roots of the vanes 28 (i.e. the portions of the vanes adjacent to the nozzle ring 24). In this embodiment the root of each vane 28 has a fillet which defines part of the abutment surface 56, however in other embodiments only one or some of the vanes may have fillets which contribute to the abutment surface 56.

A pair of seal elements in the form of elastomeric o-ring seals 58 and 59 are axially displaced from one another and are located in grooves in annular ribs 60 provided on the radially outer surface of the support structure 46. They are therefore axially fixed with respect to the support structure (and therefore the housing). The annular seals 58 and 59 form a substantially gas tight seal between a radially inner surface 62 of the main body 48 of the operating member 22 and the radially outer surface 60 the support structure 46. The seals 58, 59 also act to space apart these surfaces 60, 62 in the radial direction. The space between these surfaces 60, 62 provides a portion of a secondary inlet passage 64. Like the primary inlet passage 18, the secondary inlet passage 64 is substantially annular in shape, and is positioned substantially circumferentially about the turbine axis.

The operating member 22 has a set of twelve apertures 66 substantially regularly spaced in a substantially annular array positioned substantially circumferentially about the turbine axis. Each aperture takes the form of a through-bore running from a radially outer surface 68 of the main body 68 of operating member 22 to its radially inner surface 62, and each through bore runs in a substantially radial direction. The apertures 66 are arranged positioned within the secondary inlet passage to selectively allow fluid therethrough, as described below. However, when the operating member 22 is in the second position (as shown in FIG. 2), the seal 58 is positioned in the secondary inlet passage and substantially prevents the flow of fluid through the apertures 66 (therefore preventing flow of fluid through the secondary inlet passage 64). With the relative positions of the apertures 66 and seal 58 in this first configuration, all exhaust which enters the inlet volute 14 must therefore pass through the primary inlet passage 18. This maximises the efficiency of the turbine, and therefore maximises the boost pressure generated by the compressor (not shown) turbocharger. The turbine is therefore utilised with the operating member 22 in this first position (and therefore with the seal 58 and apertures 66 in this first configuration) during normal operation of the turbocharger, where high boost pressures are desired so as to maximise the power and/or fuel economy provided by the engine.

Figure 3:
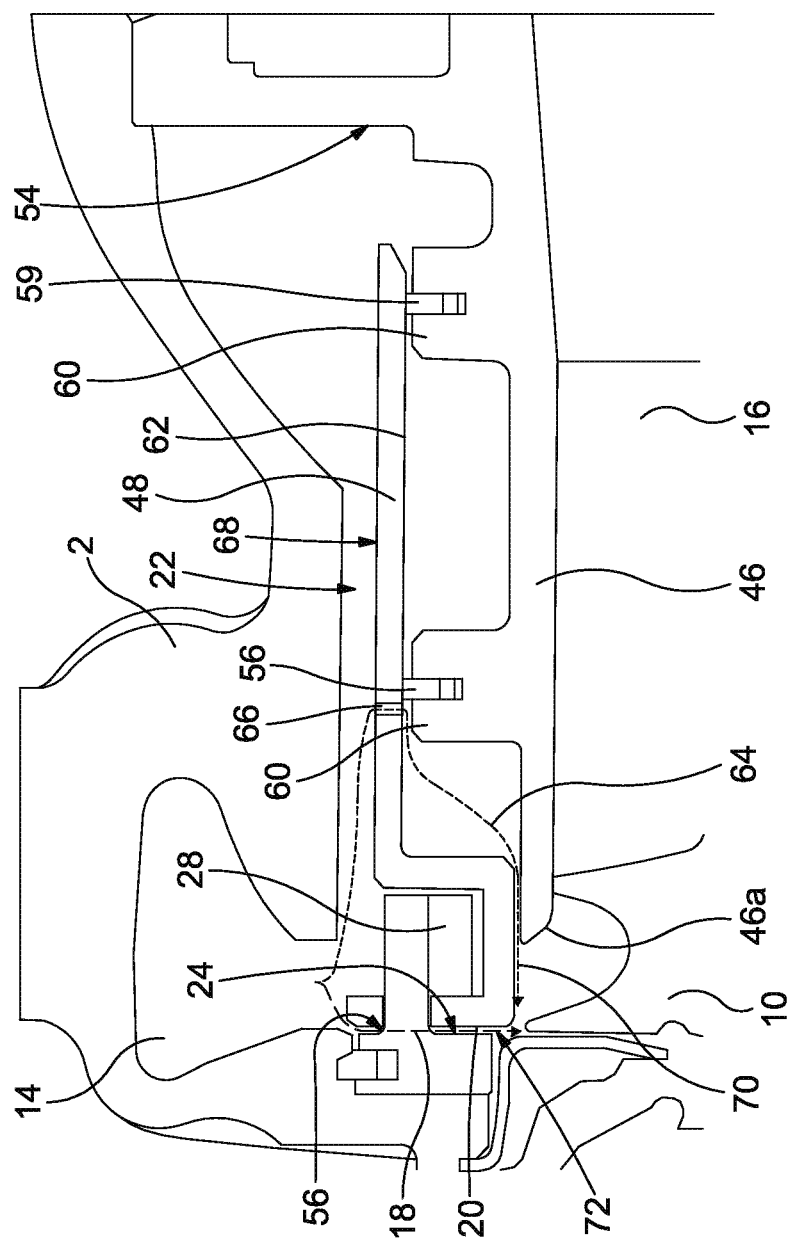
FIG. 3 shows the portion of the turbine of FIG. 2, with the operating member in a second position.

FIG. 3 shows the same portion of the turbine of the embodiment as FIG. 2, but the operating member 22 has been moved to the second position. As the seal 58 is axially fixed relative to the housing 2 and the set of apertures 66 is axially fixed relative to the operating member 22 (that is to say axially movable relative to the housing 2), movement of the operating member to its second position also moves the relative positions of the seal 58 and set of apertures 66 so as to occupy a second configuration. In this configuration, exhaust gas in the inlet volute 14 can flow through the apertures and thus through the secondary inlet passage 64. This exhaust exits through an outlet 70 of the secondary inlet passage 64 just radially inwards of an outlet 72 of the primary inlet passage 18, and therefore circumnavigates the primary inlet passage 18 in its entirety. The secondary flow (the flow through the secondary inlet passage 64) re-combining with the primary flow (the flow through the primary inlet passage 18) at this point disrupts the stability primary flow just prior to its entry into the turbine wheel 10. As outlined above, this can reduce the amount of energy extracted from the exhaust by the turbine wheel 10, lowering the turbine efficiency and thereby reducing the boost pressure generated. The turbine can therefore be utilised with the operating member 22 in this second position (and therefore with the seal 58 and apertures 66 in this second configuration) for exhaust gas heating and/or engine braking, where the flow rate through the turbine is to be decreased (by decreasing the size of the primary inlet passage 18) without producing excessive boost pressures. In addition, the presence of the secondary inlet passage 64 with the first and second walls 24, 20 in a "closed" position can also ensure that at least some exhaust is able to pass through the turbine even if none can pass through the primary inlet passage 18 (thereby potentially reducing engine damage as outlined above).

The outlet 70 of the secondary inlet passage 64 (which in this embodiment is integral to the secondary inlet passage) directs the secondary flow as it exits the passage. The direction in which the secondary flow exits the secondary outlet passage 64 through the outlet 70 is substantially opposite to the direction to the direction of fluid flow out of the turbine wheel 10, which may provide one or more of the advantages discussed above.

Numerous modifications and variations may be made to the exemplary designs described above without departing from the scope of the invention as defined in the claims. For instance, though in the above embodiment it is the shroud plate (i.e. the one of the first and second walls which includes openings for the vanes) that is axially movable to control the size of the primary inlet passage, in other embodiments the shroud plate may be fixed and the nozzle ring (i.e. the one of the first and second walls on which the vanes are provided) may be axially movable.

Alternatively or in addition, though in the above embodiment the operating member is on the opposite axial side of the turbine wheel to the bearing, the invention may also be utilised in a turbine in which the operating member is on the same axial side of the turbine wheel as the bearing.

Though the above embodiment utilises a circumferential array of identical apertures, it is to be understood that any other suitable configuration may be used. For instance, other embodiments may utilise a set of apertures which comprises a single aperture. Alternatively, the set may comprise an irregular array of apertures and/or apertures of dissimilar size and/or shape. FIG. 4 shows a set of diagrams of exemplary (simplified) operating members 22 with different arrays of apertures 66 therein. FIG. 4A shows an example where the apertures 66 are spaced apart from each other axially as well as circumferentially. In this example the apertures are of uniform size and shape, and are uniformly spaced both axially and circumferentially. In FIG. 4B, the apertures 66 are regularly spaced circumferentially but are irregularly spaced axially, and the apertures are not of uniform size. In FIG. 4C the apertures are spaced axially but are not spaced circumferentially about the operating member 22. Also, the apertures 66 are not of uniform shape (the central aperture being square and the apertures on either side thereof being circular) or of uniform size.

Furthermore, whilst the variable geometry turbine described forms part of a variable geometry turbocharger, it will be appreciated that this need not be the case. For example, the variable geometry turbine may be linked to a crankshaft and/or gear which transmits mechanical power to a flywheel or a power generating device.

Figure 5:
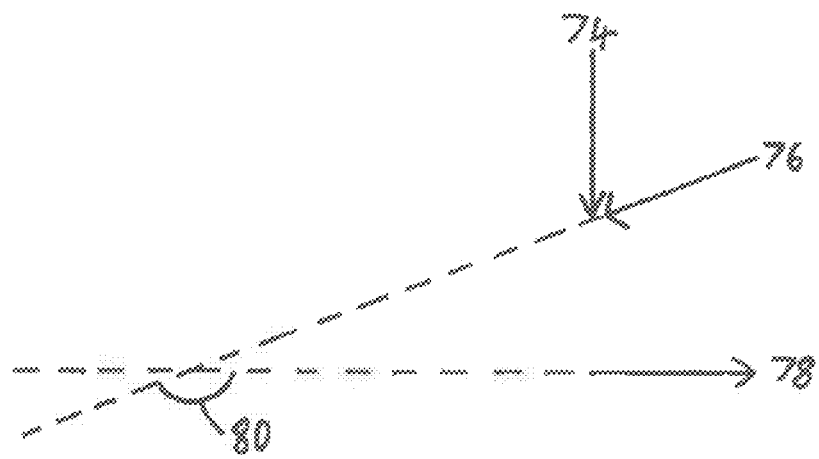
FIG. 5 shows exemplary diagrams of flow directions and the angles therebetween.
Figure 5:
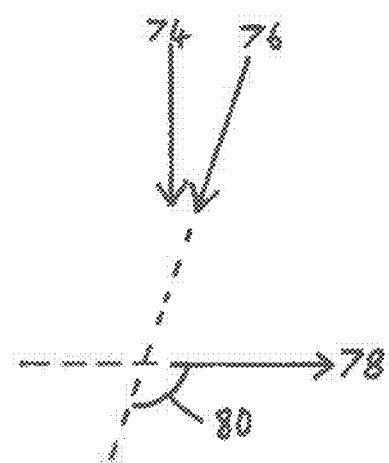
Figure 5:
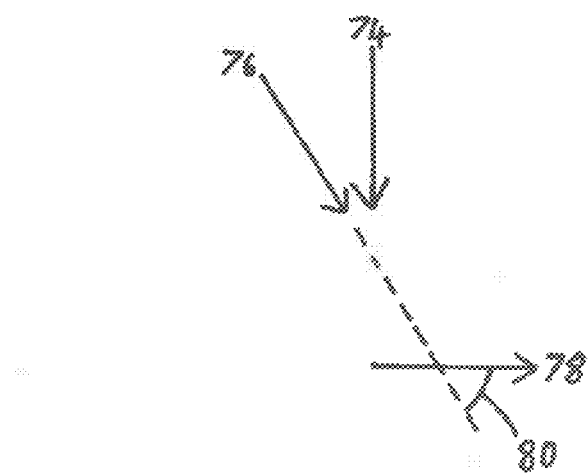

As indicated above, reference to the angle between the direction of exit of secondary flow and the direction of axial outflow of the turbine wheel is reference to the angle through which secondary flow must rotate in order to become aligned with the direction of axial outflow. Exemplary diagrams which illustrate this concept are provided in FIG. 5, where 74 denotes the direction of the primary flow, 76 denotes the direction of secondary flow exiting the secondary inlet passage, 78 denotes the direction of axial outlet of the turbine, and 80 denotes is the angle in question.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. For the avoidance of doubt, optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

The invention claimed is:

1. A variable geometry turbine comprising:
   a turbine wheel supported in a housing for rotation about a turbine axis, the turbine wheel being a radial-inflow axial-outflow turbine wheel and the housing having a first wall;
   an axially movable operating member having a second wall;
   a primary inlet passage upstream of the turbine wheel, the inlet passage being defined between the first wall of the housing and the second wall of the operating member, the axial width of the inlet passage being controllable by moving the operating member between a first axial position in which the second wall is axially distal from the first wall, and a second axial position in which the second wall is axially proximal to the first wall;

a secondary inlet passage configured to provide a bypass flow path for a working fluid which circumnavigates at least part of the primary inlet passage;

a seal element and one or more apertures, one of the seal element and the one or more apertures being axially fixed relative to the housing and the other being axially fixed relative to the operating member and movable therewith, the one or more apertures and the seal element thereby being axially movable relative to one another between a first configuration and a second configuration via movement of the operating member, wherein:

with the one or more apertures and the seal element in the first configuration the seal element is positioned in the bypass flow path to substantially prevent fluid flow therethrough, and with the one or more apertures and the seal element in the second configuration the seal element is positioned to allow flow of fluid through the one or more apertures and thereby through the secondary inlet passage;

the seal element and the one or more apertures are arranged whereby moving the operating member to the first position positions the seal element and the one or more apertures in the first configuration, and moving the operating member to the second position positions the one or more apertures and the seal element in the second configuration;

the secondary inlet passage has an outlet configured to direct working fluid to exit the secondary inlet passage in a direction which has an axial component in the opposite direction to a direction of axial outflow of the turbine wheel: and the secondary inlet passage is annular in shape and is circumferentially arranged about the turbine axis.

2. A turbine according to claim 1 wherein the outlet is configured to direct working fluid to exit the secondary inlet passage in a direction at an angle of more than 160 degrees to the direction of axial outflow of the turbine wheel.

3. A turbine according to claim 2 wherein the outlet is configured to direct working fluid to exit the secondary inlet passage in a direction opposite to the direction of axial outflow of the turbine wheel.

4. A turbine according to claim 1 wherein the secondary inlet passage is configured to provide a flow path for a working fluid which circumnavigates substantially the entire primary inlet passage.

5. A turbine according to claim 1 wherein the one or more apertures comprises a plurality of apertures.

6. A turbine according to claim 5 wherein the plurality of apertures comprises at least 6 apertures.

7. A turbine according to claim 5 wherein the plurality of apertures are provided in an annular array circumferentially disposed around the turbine axis.

8. A turbine according to claim 1 wherein each aperture of the one or more apertures takes the form of a through-bore, and defines a longitudinal axis which is aligned in a substantially radial direction.

9. A turbine according to claim 1 wherein the housing defines a support structure and the operating member takes the form of a sleeve mounted on said support structure, the secondary inlet passage being at least partially defined between a radially inner surface of the sleeve and a radially outer surface of the support structure.

10. A turbine according to claim 9 wherein each of the one or more apertures takes the form of a through-bore running from a radially outer surface of the sleeve to a radially inner surface of the sleeve.

11. A turbocharger comprising the variable geometry turbine of claim 1.

12. An internal combustion engine comprising the turbocharger of claim 11.

13. A variable geometry turbine comprising:

a turbine wheel supported in a housing for rotation about a turbine axis, the turbine wheel being a radial-inflow axial-outflow turbine wheel and the housing having a first wall;

an axially movable operating member having a second wall;

a primary inlet passage upstream of the turbine wheel, the inlet passage being defined between the first wall of the housing and the second wall of the operating member, the axial width of the inlet passage being controllable by moving the operating member between a first axial position in which the second wall is axially distal from the first wall, and a second axial position in which the second wall is axially proximal to the first wall;

a secondary inlet passage configured to provide a bypass flow path for a working fluid which circumnavigates at least part of the primary inlet passage;

a seal element and one or more apertures, one of the seal element and the one or more apertures being axially fixed relative to the housing and the other being axially fixed relative to the operating member and movable therewith, the one or more apertures and the seal element thereby being axially movable relative to one another between a first configuration and a second configuration via movement of the operating member, wherein:

with the one or more apertures and the seal element in the first configuration the seal element is positioned in the bypass flow path to substantially prevent fluid flow therethrough, and with the one or more apertures and the seal element in the second configuration the seal element is positioned to allow flow of fluid through the one or more apertures and thereby through the secondary inlet passage;

the seal element and the one or more apertures are arranged whereby moving the operating member to the first position positions the seal element and the one or more apertures in the first configuration, and moving the operating member to the second position positions the one or more apertures and the seal element in the second configuration;

the secondary inlet passage has an outlet configured to direct working fluid to exit the secondary inlet passage in a direction which has an axial component in the opposite direction to a direction of axial outflow of the turbine wheel; and each aperture of the one or more apertures takes the form of a through-bore, and defines a longitudinal axis which is aligned in a substantially radial direction.

14. A variable geometry turbine comprising:

a turbine wheel supported in a housing for rotation about a turbine axis, the turbine wheel being a radial-inflow axial-outflow turbine wheel and the housing having a first wall;

an axially movable operating member having a second wall;

a primary inlet passage upstream of the turbine wheel, the inlet passage being defined between the first wall of the housing and the second wall of the operating member, the axial width of the inlet passage being controllable by moving the operating member between a first axial position in which the second wall is axially distal from the first wall, and a second axial position in which the second wall is axially proximal to the first wall;

a secondary inlet passage configured to provide a bypass flow path for a working fluid which circumnavigates at least part of the primary inlet passage;

a seal element and one or more apertures, one of the seal element and the one or more apertures being axially fixed relative to the housing and the other being axially fixed relative to the operating member and movable therewith, the one or more apertures and the seal element thereby being axially movable relative to one another between a first configuration and a second configuration via movement of the operating member, wherein:

with the one or more apertures and the seal element in the first configuration the seal element is positioned in the bypass flow path to substantially prevent fluid flow therethrough, and with the one or more apertures and the seal element in the second configuration the seal element is positioned to allow flow of fluid through the one or more apertures and thereby through the secondary inlet passage;

the seal element and the one or more apertures are arranged whereby moving the operating member to the first position positions the seal element and the one or more apertures in the first configuration, and moving the operating member to the second position positions the one or more apertures and the seal element in the second configuration;

the secondary inlet passage has an outlet configured to direct working fluid to exit the secondary inlet passage in a direction which has an axial component in the opposite direction to a direction of axial outflow of the turbine wheel;

the housing defines a support structure and the operating member takes the form of a sleeve mounted on said support structure, the secondary inlet passage being at least partially defined between a radially inner surface of the sleeve and a radially outer surface of the support structure; and each of the one or more apertures takes the form of a through-bore running from a radially outer surface of the sleeve to a radially inner surface of the sleeve.

* * * * *